United States Patent Office 3,004,999
Patented Oct. 17, 1961

3,004,999
STABLE LEAD ALKYL COMPOSITIONS AND A METHOD FOR PREPARING THE SAME
Hymin Shapiro, Baton Rouge, La., and Herbert R. Neal, Farmington, Mich., assignors to Ethyl Corporation, New York, N.Y., a corporation of Delaware
No Drawing. Filed Dec. 8, 1959, Ser. No. 858,045
4 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction product accompanying its synthesis. At temperatures above 100° C. the decomposition rate increases logarithmically so that a point is soon reached where external heat is no longer required and decomposition becomes self-propagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz. separation, purification, blending, transportation, and storage—the likelihood of excessive thermal decomposition must be provided for an effectively combatted.

An object of this invention is to stabilize alkyllead compounds against thermal decomposition during one or more of the following operations: separation, purification, blending, transportation, and storage.

This object is accomplished by incorporating with alkyllead compounds a relatively small quantity of a material which has the property of inhibiting alkyllead thermal decomposition. This object is also accomplished by conducting one or more of the foregoing operations in the presence of such a material. The materials which have been fund to possess this property are referred to below as "thermal stabilizers."

The thermal stabilizers of this invention are amides, preferably monoamides containing from 1 to about 18 carbon atoms in the molecule and having the formula $RCONH_2$, where R is hydrogen or a hydrocarbyl radical. Most preferably, the hydrocarbyl radical is an alkyl, cycloalkyl, alkenyl, aralkyl, aryl, or alkaryl group having from 1 to about 17 carbon atoms. These thermal stabilizers when used in amount varying from about 1.75 to about 10 percent by weight of the lead alkyl product are effective in substantially retarding or preventing thermal decomposition of the alkyllead compound at temperatures above 100° C. for extended periods of time.

The above thermal stabilizers are, in general, stable under the conditions to which alkyllead compounds may be subjected during their separation, purification, blending, transportation, and storage. For example, the thermal stabilizers of this invention have no tendency to react to form gums or other obnoxious reaction products in the alkyllead compositions.

The foregoing thermal stabilizers are relatively inexpensive and easily made. Another advantage in their use is that they are not corrosive to metals used in making alkyllead storage tanks, pipe lines, tank cars, storage drums, and the like.

Typical thermal stabilizers of this invention are formamide; acetamide; propionamide; butyramide; isobutyramide; valeramide; caproamide; caprylamide; lauramide; myristamide; palmitamide; stearamide; propenamide; 2-butenamide; phenacetamide; benzamide; cyclohexanamide; o-methylbenzamide; m-methylbenzamide; p-methylbenzamide; 1-naphthamide; 2-naphthamide; 1-anthramide; 2-anthramide; 9-anthramide; p-1,1,3,3-tetramethylbutyl benzamide; 4,5-diethyl-1-naphthamide; and the like.

This invention is based on the discovery that introducing an amide group, $—CONH_2$, into an aliphatic or aromatic hydrocarbon causes a substantial improvement in the thermal stabilizing ability of the resulting compound as compared with the original hydrocarbon. For example, benzene has no ability in practical concentrations to stabilize lead alkyls against thermal decomposition at temperatures above 100° C. However, benzamide (benzene into which has been introduced an amide group) exerts marked effectiveness in this regard. This same profound improvement in effectiveness carries over into all hydrocarbons from which the present thermal stabilizers are derived.

The chief thermal decomposition products of alkyllead compounds are lead metal and hydrocarbon gas, Hence, a very good index of alkyllead thermal decomposition is liberation of this gas.

To illustrate the effectiveness of this invention, direct comparisons were made between the decomposition characteristics of unstabilized and stabilized tetraethyllead. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 160° C., the sample-containing tube was quickly immersed in the bath and clamped with the levelling bottle adjusted to hold the gas buret in place at a zero reading. Then measured was the time during which the sample was held at 160° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred within 1 minute as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

But, when to the same amount of tetraethyllead there was previously added 2 percent by weight of formamide no pronounced deterioration occurred at 160° C. for 30 minutes. The same order of effectiveness subsists when repeating this experiment using other thermal stabilizers of this invention. Thus with benzamide, no pronounced deterioration occurred for over 20 minutes. In fact, comparable effectiveness is exhibited by all of the above thermal stabilizers.

The above-described beneficial behavior of the thermal stabilizers of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizers may be added in appropriate quantity to the alkyllead reaction concentrate just before the separation step which is conducted at a temperature close to the temperature where hazardous run-away decomposition is particularly prevalent. By adding one of the above thermal stabilizers to the reaction concentrate just prior to distillation, the danger arising from unexpected temperature increases is substantially eliminated.

Most preferably the above thermal stabilizers are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention.

What is claimed is:

1. A method of inhibiting the decomposition of an essentially pure alkyllead compound at temperatures from about 100° C. to about 160° C. which comprises incorporating with said compound a small amount of a monoamide containing from 1 to about 18 carbon atoms in the molecule and having the formula $$RCONH_2$$

wherein R is selected from the group consisting of hydrogen, alkyl, alkenyl, cycloalkyl, aralkyl, aryl and alkaryl radicals; said amount being sufficient to inhibit decomposition and being in the range of from about 1.75 to about 10 percent by weight based upon the weight of said compound.

2. An essentially pure alkyllead compound containing, in amount sufficient to inhibit thermal deterioration thereof at temperatures from about 100° C. to about 160° C., a monoamide as defined in claim 6; said amount being in the range of from about 1.75 to about 10 percent by weight based upon the weight of said compound.

3. Essentially pure tetraethyllead containing a small amount of formamide sufficient to inhibit thermal deterioration of the tetraethyllead at temperatures from about 100° C. to about 160° C.; said amount being in the range of from about 1.75 to about 10 percent by weight based upon the weight of the tetraethyllead.

4. Essentially pure tetraethyllead containing a small amount of benzamide sufficient to inhibit thermal deterioration of the tetraethyllead at temperatures from about 100° C. to about 160° C.; said amount being in the range of from about 1.75 to about 10 percent by weight based upon the weight of the tetraethyllead.

References Cited in the file of this patent

UNITED STATES PATENTS

| | | |
|---|---|---|
| 2,464,399 | Clem | Mar. 15, 1949 |
| 2,727,053 | Krohn | Dec. 13, 1955 |